(12) United States Patent
Watanabe et al.

(10) Patent No.: US 9,231,417 B2
(45) Date of Patent: Jan. 5, 2016

(54) RECHARGEABLE ELECTRICAL DEVICE

(75) Inventors: Kazunori Watanabe, Sao Paulo (BR); Koji Asakawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 106 days.

(21) Appl. No.: 14/342,699

(22) PCT Filed: Jun. 12, 2012

(86) PCT No.: PCT/JP2012/003823
§ 371 (c)(1),
(2), (4) Date: Mar. 4, 2014

(87) PCT Pub. No.: WO2013/042293
PCT Pub. Date: Mar. 28, 2013

(65) Prior Publication Data

US 2014/0225573 A1    Aug. 14, 2014

(30) Foreign Application Priority Data

Sep. 20, 2011  (JP) ................................. 2011-205027

(51) Int. Cl.
*H02J 7/16* (2006.01)
*H02J 7/00* (2006.01)
(Continued)

(52) U.S. Cl.
CPC ........... *H02J 7/0029* (2013.01); *H01M 10/448* (2013.01); *H02J 7/007* (2013.01); *H02J 7/04* (2013.01); *H01M 2220/30* (2013.01); *H02J 2007/0037* (2013.01)

(58) Field of Classification Search
CPC ....................................................... H02J 7/0073
USPC ......................................................... 320/155
See application file for complete search history.

(56) References Cited

U.S. PATENT DOCUMENTS 5,350,996 A   9/1994   Tauchi
5,510,693 A   4/1996   Theobald
(Continued)

FOREIGN PATENT DOCUMENTS

EP    0 964 497 A2   12/1999
JP    64-005334 A     1/1989
(Continued)

OTHER PUBLICATIONS

International Search Report issued in International Application No. PCT/JP2012/003823 mailed Aug. 21, 2012, with English translation, 4 pgs.
(Continued)

*Primary Examiner* — Suresh Memula
(74) *Attorney, Agent, or Firm* — McDermott Will & Emery LLP

(57) ABSTRACT

The charging current value in the first trickle charge after the rapid charge is differentiated from the charging current value in the second and subsequent trickle charge. Thus, for example, in the first trickle charge, charging can be performed with the charging current value required to simultaneously activate and charge an inactive battery. In the second and subsequent trickle charge, charging can be performed with the charging current value required to compensate for self-discharge of a rechargeable battery. By charging the battery with the charging current value required to compensate for self-discharge of the battery in the second and subsequent trickle charge, power consumption required to charge the battery can be reduced, compared to the case where the trickle charge is continued with a constant charging current value required to simultaneously activate and charge the inactive battery, as the conventional device.

4 Claims, 6 Drawing Sheets

(51) Int. Cl.
*H02J 7/04* (2006.01)
*H01M 10/44* (2006.01)

(56) References Cited

U.S. PATENT DOCUMENTS

| | | | | |
|---|---|---|---|---|
| 5,539,298 | A * | 7/1996 | Perkins | H02J 7/0093 320/106 |
| 5,818,202 | A | 10/1998 | Miyamoto et al. | |
| 6,104,165 | A | 8/2000 | Miyamoto et al. | |
| 6,172,480 | B1 | 1/2001 | Vandelac | |
| 2001/0048287 | A1 * | 12/2001 | Vandelac | H02J 7/0042 320/125 |
| 2004/0263119 | A1 * | 12/2004 | Meyer | H02J 7/0004 320/116 |
| 2009/0309547 | A1 * | 12/2009 | Nakatsuji | H01M 10/441 320/134 |

FOREIGN PATENT DOCUMENTS

| | | |
|---|---|---|
| JP | 1-180145 U | 12/1989 |
| JP | 04-244740 A | 9/1992 |
| JP | 5-137271 A | 6/1993 |
| JP | 06-014472 A | 1/1994 |
| JP | 2007-259632 A | 10/2007 |
| JP | 2009-232669 A | 10/2009 |
| WO | 93/15412 A1 | 8/1993 |
| WO | 98/31088 A2 | 7/1998 |

OTHER PUBLICATIONS

European Extended Search Report issued in corresponding European Patent Application No. 12833302.8, mailed on Aug. 14, 2015.

* cited by examiner

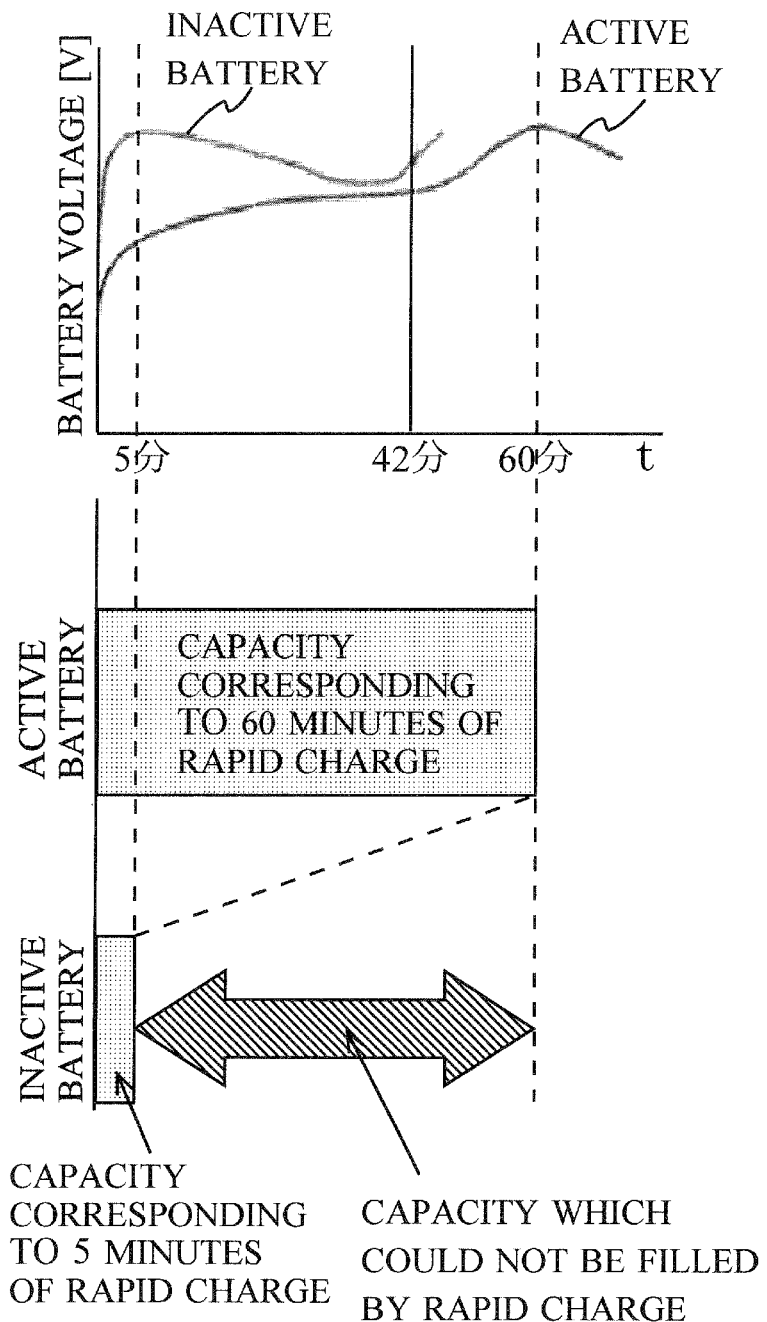

RECHARGEABLE ELECTRICAL DEVICE

RELATED APPLICATIONS

This application is the U.S. National Phase under 35 U.S.C. §371 of International Application No. PCT/JP2012/003823, filed on Jun. 12, 2012, which in turn claims the benefit of Japanese Application No. 2011-205027, filed on Sep. 20, 2011, the disclosures of which Applications are incorporated by reference herein.

TECHNICAL FIELD

The present invention relates to a rechargeable electrical device which can charge a built-in rechargeable battery rapidly, and more particularly, it relates to a rechargeable electrical device which has a trickle charge function.

BACKGROUND ART

In recent years, with the development of portable rechargeable electrical devices such as an electrical shaver, a nickel metal hydride (Ni-MH) rechargeable battery is becoming to be widely used as a rechargeable battery. With the widespread use of the nickel metal hydride rechargeable battery, a charging function of a rechargeable electrical device is becoming more advanced. There has been a remarkable increase in the number of rechargeable electrical devices which charge their rechargeable batteries rapidly with a charging current larger than the conventional charging current so as to enable to finish charging their rechargeable batteries in a shorter charging time than the conventional rechargeable electrical device. Even after the rapid charge, the rechargeable electrical device using the nickel metal hydride rechargeable battery as a rechargeable battery continues charging with a minute electric current having a constant current value smaller than the charging current value in the rapid charge in order to either compensate for self-discharge of the rechargeable battery or activate the rechargeable battery in an inactive state. The above-described charging with a minute electric current having a constant current value is called a trickle charge.

By the way, in rechargeable electrical devices comprising a rechargeable battery, it is generally necessary to prevent overcharging of the rechargeable battery so as to prevent overheating and explosion of the rechargeable battery. Thus, conventionally, a microcomputer in many such rechargeable electrical devices is provided with a function to detect a residual capacity of the rechargeable battery (residual capacity detection function) so as to stop (end) charging the rechargeable battery when the microcomputer detects that the residual capacity has become 100% (full charge). However, in the full charge detection method using the residual capacity detection function, it is required to keep the microcomputer active to control at least the amount of charged current to the rechargeable battery and the amount of discharged current from the rechargeable battery to the load, resulting in the problem of power consumption in the microcomputer.

On the other hand, a nickel metal hydride rechargeable battery as a rechargeable battery has a characteristic that in being charged, it reaches a state of nearly full charge when the value of the battery voltage has become slightly lower than the peak value after the value of the battery voltage passes the peak value. Thus, there has been an increase in the number of rechargeable electrical devices, comprising a nickel metal hydride rechargeable battery, each of whose microcomputers determines that the battery has reached a state of full charge when the value of the battery voltage has become slightly lower than the peak value after passing the peak value, so as to stop the rapid charge (refer to Patent Document 1), using the above-described characteristic. Such rechargeable electrical devices need not keep the microcomputer activate to control the amount of charged current and the amount of discharged current, making it possible to reduce power consumption, in contrast to the above-described conventional rechargeable electrical device with the above-described residual capacity detection function.

However, the above-described rechargeable electrical devices, which stop the rapid charge when the value of the battery voltage has become slightly lower than the peak value after passing the peak value, cannot make an inactive nickel metal hydride rechargeable battery (hereafter referred to as an inactive battery) full charge only with the rapid charge.

Referring to FIG. 8, the above-described point will be described. As described above, when the rapid charge on an active battery, which is not in an inactive state, is continued, the active battery reaches a state of nearly full charge when the value of the battery voltage has become slightly lower than the peak value (for example, after 60 minutes from the start of the rapid charge shown in FIG. 8) after the value of the battery voltage passes the peak value. However, in general, when the rapid charge on the inactive battery has been done, the value of the battery voltage often reaches a peak value, which is different from the above-described peak value corresponding to the full charge, within a certain time period from starting the charge. For this reason, when the value of the battery voltage has passed the peak value different from the above-described primary peak value (for example, after 5 minutes from the start of the rapid charge shown in FIG. 8), such conventional rechargeable electrical devices often misdetermine that the rechargeable battery has reached a state of full charge, thereby stopping the rapid charge before full charge. As a countermeasure against this insufficient charge occurred in the inactive battery, such conventional rechargeable electrical devices continues the trickle charge after the stop of the rapid charge so as to simultaneously perform activating the inactive battery and charging the rechargeable battery to full charge by compensating for the capacity, shown by the two-headed arrow in FIG. 8, which could not be filled by the rapid charge.

PRIOR ART DOCUMENTS

Patent Documents

Patent document 1: Japanese Laid-open Patent Publication Hei 6-14472

DISCLOSURE OF INVENTION

However, the above-described conventional rechargeable electrical device, which continues a trickle charge after the stop of the rapid charge, continues to apply a trickle charge current with a constant current value to its rechargeable battery after the stop of the rapid charge in order to not only simultaneously perform activating and charging its inactive battery but also compensate for self-discharge of its rechargeable battery. Thus, the above-described conventional rechargeable electrical device has the below-described problem.

In general, the value of the trickle charge current required to activate (and charge simultaneously) the inactive battery is larger than the value of the trickle charge current required to compensate for self-discharge of a rechargeable battery. Accordingly, the value of the trickle charge current, which is required after the inactive battery has been activated and charged to full charge once, is smaller than that required before the inactive battery is activated and charged to full charge once. Despite this, the above-described conventional rechargeable electrical device, which continues a trickle charge after the stop of the rapid charge, continues to apply a trickle charge current, which is required to simultaneously activate and charge the inactive battery and has a constant current value, to its rechargeable battery after the stop of the rapid charge. This results in wasteful power consumption.

The present invention is conceived to solve the above-described problems of the conventional art and aimed to provide a rechargeable electrical device which can simultaneously perform activating and charging its inactive battery in the trickle charge, and can reduce power consumption required to charge its rechargeable battery.

According to the present invention, this object is achieved by a rechargeable electrical device comprising: a rechargeable battery; a switching element provided between the rechargeable battery and a power source; and a control means which includes a time measuring means for measuring time, and which controls a duty cycle, which is a ratio of an on period and an off period of the switching element, based on time output from the time measuring means, so as to control a charging current value to the rechargeable battery. Charging the rechargeable battery includes both a rapid charge and a trickle charge to charge the rechargeable battery after a stop of the rapid charge with an electric current having a current value smaller than a charging current value in the rapid charge. The control means sets the charging current value in a first trickle charge after the stop of the rapid charge to a different value from the charging current value in second and subsequent trickle charges after the stop of the rapid charge.

In the above-described configuration, the charging current value in the first trickle charge after the stop of the rapid charge is set to a different value from the charging current value in the second and subsequent trickle charges. Thus, for example, in the first trickle charge, charging can be performed with the charging current value required to simultaneously perform activating and charging an inactive battery. On the other hand, in the second and subsequent trickle charges, charging can be performed with the charging current value required to compensate for self-discharge of the rechargeable battery. Accordingly, in the first trickle charge, the rechargeable electrical device can simultaneously perform activating and charging the inactive battery. On the other hand, in the second and subsequent trickle charges, the rechargeable electrical device can charge the rechargeable battery with the charging current value required to compensate for self-discharge of the rechargeable battery. Thus, the rechargeable electrical device can reduce power consumption required to charge the rechargeable battery, as compared to the case where the trickle charge is continued with a constant charging current value, which is required to simultaneously activate and charge the inactive battery, as the conventional rechargeable electrical device.

In this rechargeable electrical device, the control means may set a charging pause time between the rapid charge and the first trickle charge, and/or between each of first and subsequent trickle charges after the stop of the rapid charge.

In this rechargeable electrical device, it is preferable that the control means sets the charging current value in the second and subsequent trickle charges to a value lower than the charging current value in the first trickle charge.

BRIEF DESCRIPTION OF THE DRAWINGS

FIG. 8 is a graph showing that conventional rechargeable electrical devices cannot make an inactive nickel metal hydride rechargeable battery full charge only with the rapid charge.

MODE FOR CARRYING OUT THE INVENTION

Figure 1:
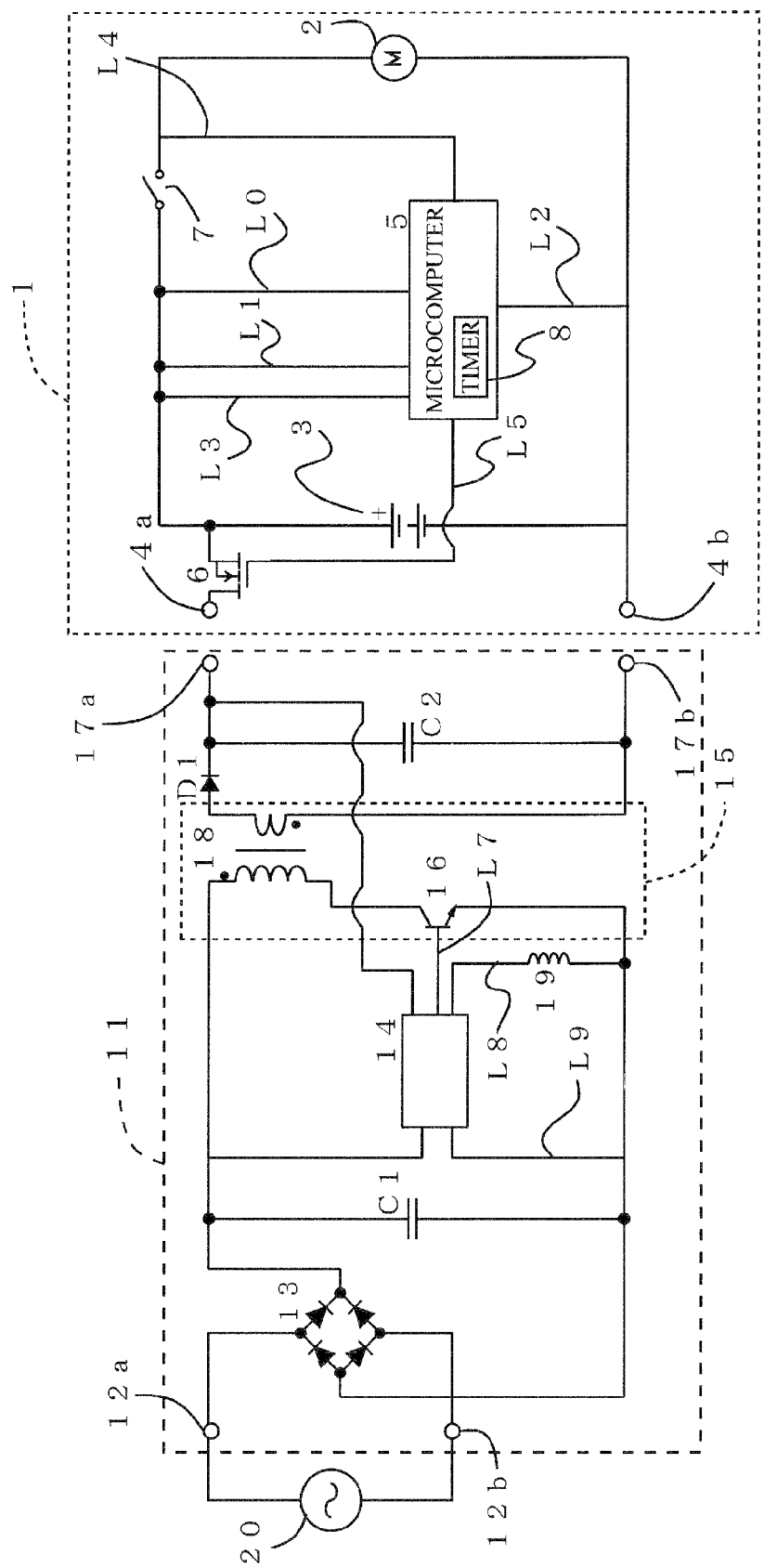
FIG. 1 is a schematic circuit diagram of an electrical shaver, which is a rechargeable electrical device according to an embodiment of the present invention, and an adapter.

An electrical shaver 1, which is a rechargeable electrical device according to an embodiment of the present invention, will be described hereinafter with reference to the drawings. FIG. 1 is a schematic circuit diagram of an electrical shaver 1 (claimed "a rechargeable electrical device") according to this embodiment, and an adapter 11 to be connected to the electrical shaver 1 for charging. The electrical shaver 1 is a rechargeable electrical shaver. The electrical shaver 1 comprises a motor 2 which is a load, a rechargeable battery 3 for supplying power to the motor 2, and charge terminals 4a, 4b electrically connected to the rechargeable battery 3. The rechargeable battery 3 is formed of a plurality of series-connected nickel metal hydride battery cells each with a normal cell voltage of 1.4V. The rechargeable battery 3 formed of a plurality of nickel metal hydride battery cells has a charge characteristic that if the charging of the rechargeable battery 3 in an active state is started with a residual capacity less than a certain threshold value, the rechargeable battery 3 reaches a state of nearly full charge when the value of the battery voltage of the rechargeable battery 3 has become a value lower than a peak value after the value of the battery voltage passes the peak value. Charging the rechargeable battery 3 in this electrical shaver 1 includes both a rapid charge and a trickle charge to charge the rechargeable battery 3 after the stop of the rapid charge with an electric current having a current value smaller than the charging current value in the rapid charge.

The above-described electrical shaver 1 comprises a microcomputer 5 (control means) to control the entire electrical shaver 1, and a switching element 6. The microcomputer 5 comprises a timer 8 (time measuring means) for measuring time. The microcomputer 5 controls a duty cycle which is a ratio of an on period and an off period of the switching element 6 based on time output from the timer 8 so as to control a charging current value to the rechargeable battery 3. Additionally, the microcomputer 5 keeps the switching element 6 in the off-state for a predetermined time based on time output from the timer 8 in order to set a charging pause time between a rapid charge and the first trickle charge after the rapid charge, and/or between each of the first and subsequent trickle charges after the rapid charge.

The switching element 6 is an n-channel enhancement type MOSFET (metal oxide semiconductor field effect transistor). This switching element 6 is provided between the rechargeable battery 3 and the adapter 11 (i.e. between the rechargeable battery 3 and a commercial power source 20). The switching element 6 switches between disconnection (off) and connection (on) of the path, which connects the charge terminal 4a and the positive terminal of the rechargeable battery 3, according to high and low voltage levels of the control signal input from the microcomputer 5 to the gate of the switching element 6 through the line L5. More specifically, when the voltage level of the control signal input to the gate of the switching element 6 is high, the drain-source path of the switching element 6 is rendered conductive to connect the charging path from the charge terminal 4a to the positive terminal of the rechargeable battery 3 so that the rechargeable battery 3 is charged. On the other hand, when the voltage level of the control signal input to the gate of the switching element 6 is low, the drain-source path of the switching element 6 is rendered non-conductive to disconnect the charging path from the charge terminal 4a to the positive terminal of the rechargeable battery 3 so as to prevent charging the rechargeable battery 3.

A plurality of input and output terminals (not shown) of the microcomputer 5 are respectively connected to lines L0 to L5. The line L0 is an input line for detecting a charging current value to the rechargeable battery 3. The microcomputer 5 allows an input current to the line L0 to flow through an internal resistor provided inside the microcomputer 5, and measures a voltage drop value due to the internal resistor, and further uses the voltage drop value to detect (determine) a charging current value to the rechargeable battery 3. The line L1 is an input line for detecting a value of voltage at the positive terminal of the rechargeable battery 3. The ground line (hereafter referred to as the GND line) L2 is an input line for detecting a value of voltage at the negative terminal of the rechargeable battery 3. Based on the voltage applied to the line L1 and the voltage applied to the GND line L2, the microcomputer 5 detects a value of battery voltage of the rechargeable battery 3.

The line L3 is an input line to connect the rechargeable battery 3 to the microcomputer 5 for supplying power to the microcomputer 5. Further, the line L4 is an input line for detecting a value of discharge current discharged from the rechargeable battery 3 to the motor 2. The microcomputer 5 allows the input current to the line L4 to flow through an internal resistor provided inside the microcomputer 5, and measures a voltage drop value due to the internal resistor, and further uses the voltage drop value to detect (determine) a discharging current value to the motor 2. Then, based on the detected discharging current value, the microcomputer 5 prevents an overcurrent from flowing into the motor 2 which is a load. The line L5 is an output line for a control signal for controlling switching between connection and disconnection of the (charging) path from the charge terminal 4a to the positive terminal of the rechargeable battery 3. The microcomputer 5 adjust (change) the duty cycle, which is a ratio of an on period and an off period of the switching element 6, according to the level of the charging current value detected based on the input current to the line L0 so as to perform feedback control of the charging current value to the rechargeable battery 3.

The above-described electrical shaver 1 further comprises an operation switch 7. When the operation switch 7 is turned on and short-circuited by a user in use of the electrical shaver 1, the rechargeable battery 3 is electrically connected to the motor 2 to allow the rechargeable battery 3 to supply power to the motor 2 so as to drive the motor 2.

Next, the adapter 11 will be described. The adapter 11 is a switching power supply unit to convert alternating-current (AC) power (voltage) from a commercial power source 20 to direct-current (DC) power (voltage) so as to supply power (voltage) to the electrical shaver 1. The adapter 11 comprises connection terminals 12a, 12b for connection to the commercial power source 20 and power supply terminals 17a, 17b for connection (and power supply) to the electrical shaver 1. When the rechargeable battery 3 is charged, the connection terminals 12a, 12b of the adapter 11 are connected to the commercial power source 20, and the power supply terminals 17a, 17b of the adapter 11 are connected to the electrical shaver 1 to provide the electrical shaver 1 with DC power based on the AC power supplied from the commercial power source 20.

The adapter 11 comprises a diode bridge 13 to convert AC voltage input from the commercial power source 20 to DC ripple voltage, and a smoothing capacitor C1 to smooth the DC ripple voltage output from the diode bridge 13 and convert it to a substantially constant DC voltage.

The adapter 11 further comprises a control circuit 14 for controlling the entire adapter 11, and a step-down voltage converter circuit 15 to reduce the DC voltage supplied by the smoothing capacitor C1. The control circuit 14 is operated based on the DC voltage power supplied by the diode bridge 13 and the smoothing capacitor C1. The step-down voltage converter circuit 15 comprises a transformer 18 to reduce voltage, and a transistor 16 for switching between a voltage applied state and a voltage non-applied state of voltage to a primary winding of the transformer 18. The transistor 16 is a bipolar transistor of NPN type.

The control circuit 14 switches between conduction (ON) and non-conduction (OFF) of the collector-emitter path of the transistor 16 by switching between high and low voltage levels applied to the base of the transistor 16 through an output line L7. By switching between conduction and non-conduction of the collector-emitter path of the transistor 16 as described above, the control circuit 14 switches between the voltage applied state and the voltage non-applied state of voltage to the primary winding of the transformer 18. Further, the control circuit 14 controls a ratio of a high level period to a low level period of the voltage applied to the base of the transistor 16 so as to control a ratio (so-called duty cycle) of a conduction (ON) period and a non-conduction (OFF) period of the collector-emitter path. Thereby, the control circuit 14 controls the voltage of power output from a secondary winding of the transformer 18 to be substantially constant.

The adapter 11 further comprises a transformer 19 for detecting a voltage level induced in the secondary winding of the transformer 18. The control circuit 14 detects a value of voltage induced in the transformer 19 through an input line L8 and a GND line L9 so as to perform feedback control of the duty cycle of the voltage applied to the base of the transistor 16 based on the detected value of the voltage of the transformer 19.

The adapter 11 still further comprises a backflow preventing diode D1 to which the pulsed power output from the secondary winding of the transformer 18 is applied, and a smoothing capacitor C2 for smoothing the voltage of the power output from the diode D1.

Figure 2:
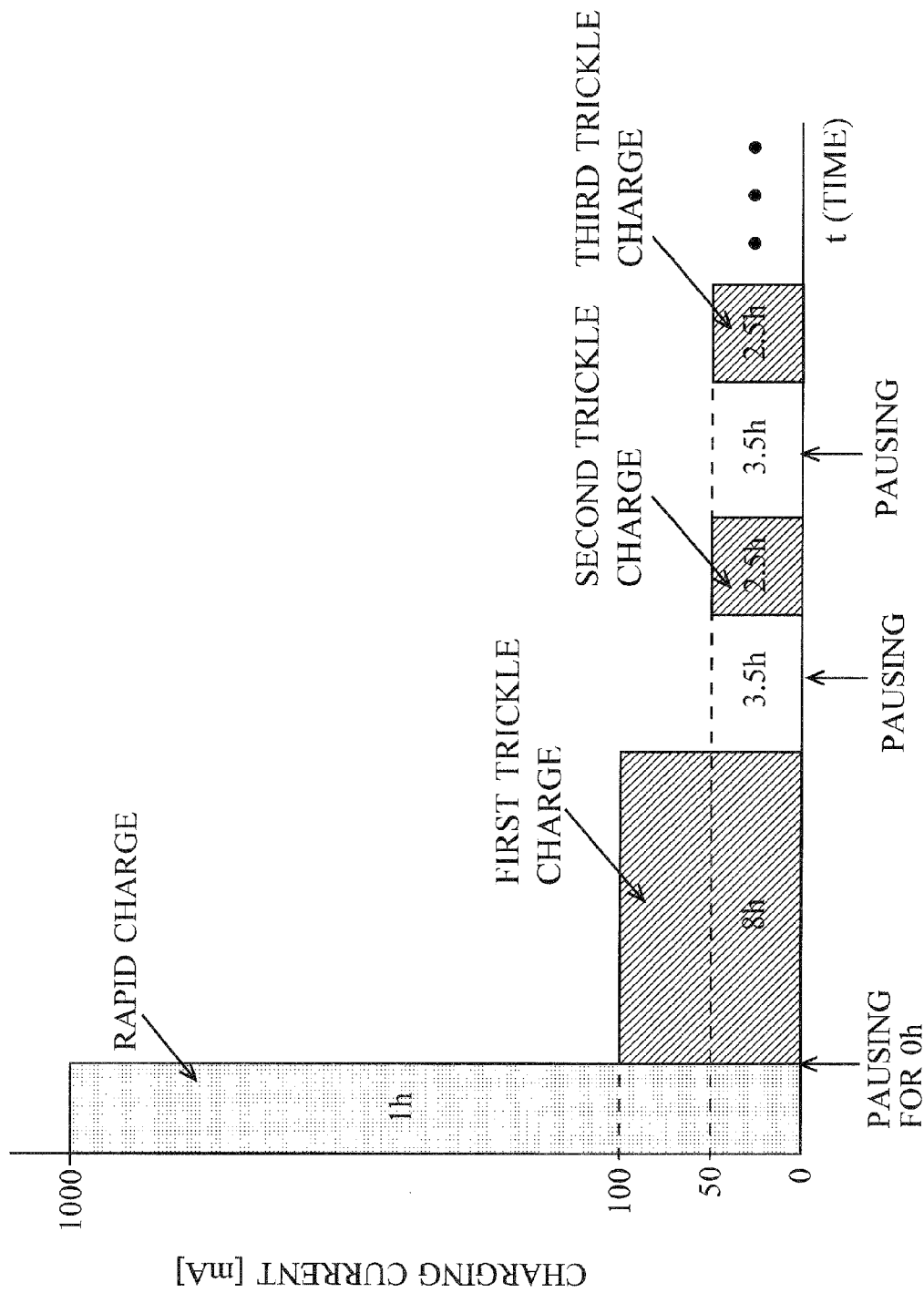
FIG. 2 is a graph showing a pattern of a rapid charge and a trickle charge in the above-described electrical shaver.

Referring now to FIG. 2, a method of trickle charging applied to the electrical shaver 1 according to this embodiment will be described. In the method of trickle charging applied to the electrical shaver 1, the microcomputer 5 sets the charging current value in the first trickle charge after a stop of the rapid charge to a different value from the charging current value in the second and subsequent trickle charges after the stop of the rapid charge. Specifically, the microcomputer 5 sets the charging current value (50 milliamperes) in the second and subsequent trickle charges to a value lower than the charging current value (100 milliamperes) in the first trickle charge. The charging current value (100 milliamperes) in the first trickle charge is the value of the current required to simultaneously perform activating and charging an inactive nickel metal hydride rechargeable battery (hereafter referred to as an inactive battery). The charging current value (50 milliamperes) in the second and subsequent trickle charges is the value of the trickle charge current required to compensate for self-discharge of a rechargeable battery.

As shown in FIG. 2, the microcomputer 5 does not set a charging pause time between the rapid charge and the first trickle charge (i.e., sets a charging pause time after the rapid charge to 0 hours), but sets a charging pause time between each of the first and subsequent trickle charges. Specifically, by controlling the switching element 6, the microcomputer 5 performs the rapid charge with a current value of 1000 milliamperes for an hour, and subsequently shifts to the first trickle charge without a charging pause time. The microcomputer 5 charges the rechargeable battery 3 with a current value of 100 milliamperes for eight hours in the first trickle charge, and then pauses charging for 3.5 hours. After this, the microcomputer 5 repeats charging with a current value of 50 milliamperes for 2.5 hours in each of the second and subsequent trickle charges and pausing charging for 3.5 hours. Note that the above-described charging pause time between each of the first and subsequent trickle charges is set to a time which does not affect the use of the electrical shaver 1 (i.e., a time which is short enough to prevent the electrical shaver 1 from becoming unable to be used due to self-discharge of the rechargeable battery 3 and power consumption of the microcomputer 5).

Figure 3:
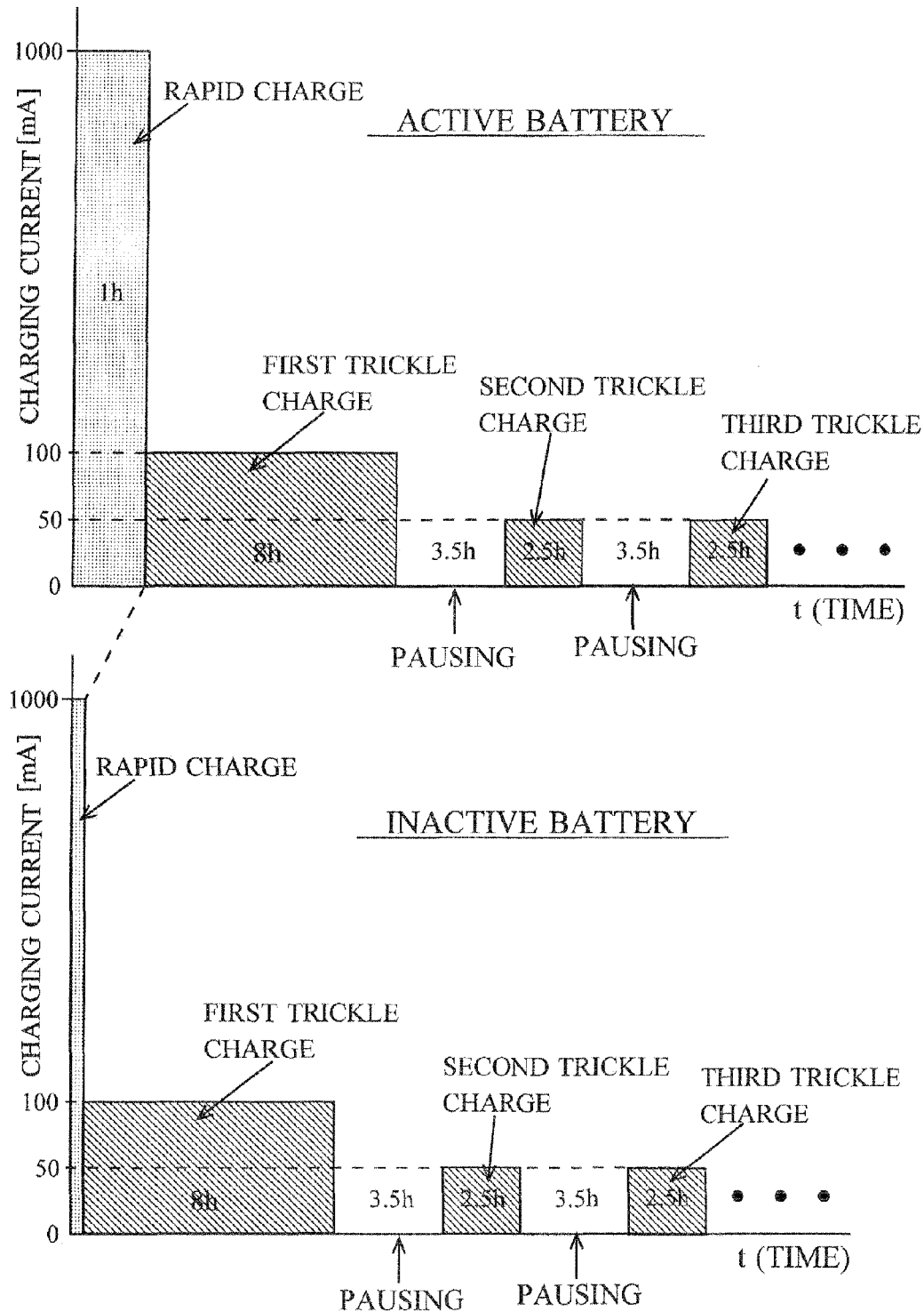
FIG. 3 is graphs each of which shows a pattern of the rapid charge and the trickle charge in the case of charging an active rechargeable battery and in the case of charging an inactive rechargeable battery in the above-described electrical shaver.

In the case where the trickle charge is performed in the pattern shown in FIG. 2, the rechargeable battery 3 can be made full charge, even if the rechargeable battery 3 to be charged is inactive. This point will be described below with reference to FIG. 3. FIG. 3 shows graphs each of which shows a pattern of the rapid charge and the trickle charge in the case where the electrical shaver 1 charges an active (rechargeable) battery and in the case where the electrical shaver 1 charges the inactive battery. Similar to the conventional rechargeable electrical device described in Patent Document 1, the electrical shaver 1 stops the rapid charge when the value of the battery voltage has become slightly lower than a peak value after passing the peak value, as shown in FIG. 8. Thus, when the rechargeable battery 3 to be charged is inactive, the electrical shaver 1 often stops the rapid charge before full charge. Accordingly, as shown in FIG. 3, when the electrical shaver 1 charges the inactive battery, the rapid charge time becomes shorter than when the electrical shaver 1 charges the active battery. This results in insufficient charge.

As a countermeasure against the above-described insufficient charge which is occurred in the inactive battery, the microcomputer 5 of the electrical shaver 1 charges the rechargeable battery 3 with the value (100 milliamperes) of the current required to simultaneously perform activating and charging the inactive battery for eight hours in the first trickle charge after the rapid charge, as shown in the lower part of FIG. 3. By the first trickle charge, the microcomputer 5 simultaneously performs activating the inactive rechargeable battery 3 and compensating for the capacity, which was not filled by the rapid charge and is indicated by the two-headed arrow in FIG. 8, so as to charge the rechargeable battery 3 to full charge. After this, as shown in the lower part of FIG. 3, the microcomputer 5 charges the rechargeable battery 3 in order to compensate for self-discharge of the rechargeable battery 3 in each of the second and subsequent trickle charges. As described above, in the electrical shaver 1, the microcomputer 5 charges the rechargeable battery 3 with the value of the current required to simultaneously perform activating and charging the inactive battery in the first trickle charge so as to be able to make the rechargeable battery 3 full charge even if the rechargeable battery 3 to be charged is inactive.

On the other hand, when the rechargeable battery 3 to be charged is an active battery, the rechargeable battery 3 is charged to a state of nearly full charge with the rapid charge. Accordingly, in this case, the purpose of charging in the first trickle charge is to compensate for self-discharge of the rechargeable battery 3.

Figure 4:
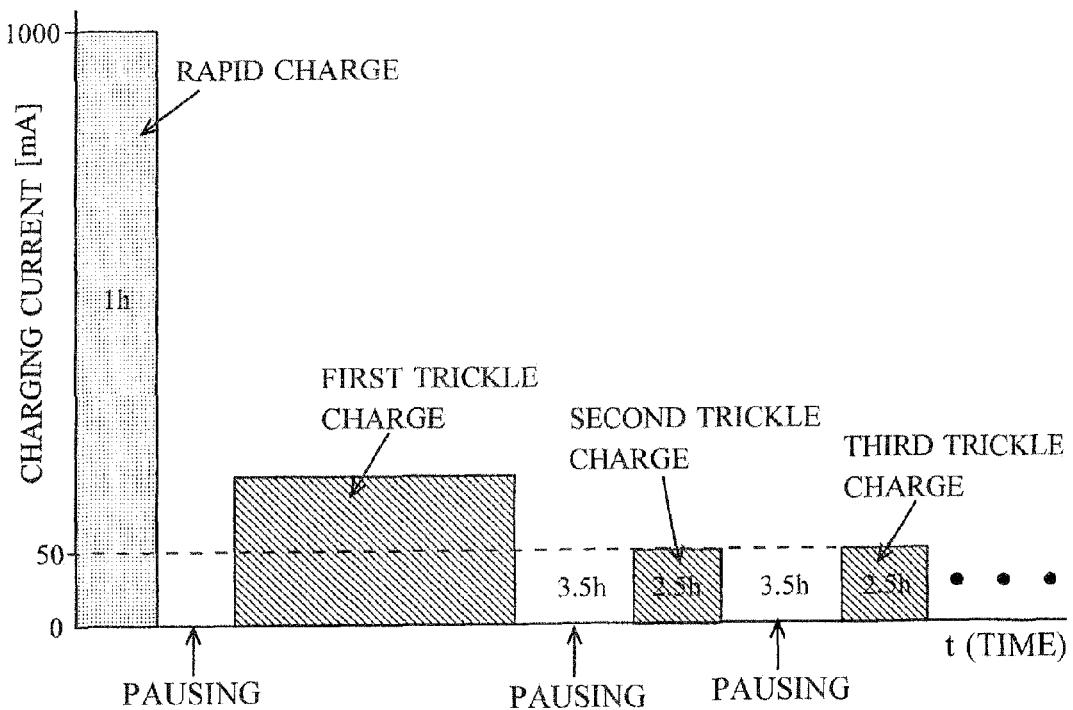
FIG. 4 is a graph showing one modified example of a pattern of the trickle charge in the above-described electrical shaver.

Next, referring to FIGS. 4 to 7, modified examples of the pattern of the trickle charges which are performed in the electrical shaver 1 will be described. The pattern of the trickle charges shown in FIG. 4 is different from the pattern of the trickle charges shown in FIG. 2 in that a charging pause time is set between the rapid charge and the first trickle charge. Other points are basically the same as the pattern of the trickle charges shown in FIG. 2. However, it is preferable that the period of the first trickle charge shown in FIG. 4 is longer than the period (eight hours) of the first trickle charge shown in FIG. 2 in order to compensate for a residual capacity shortage (due to self-discharge) caused by setting a charging pause time between the rapid charge and the first trickle charge. Alternatively, it is preferable that the charging current value in the first trickle charge shown in FIG. 4 is set higher than the charging current value (100 milliamperes) in the first trickle charge shown in FIG. 2 in order to compensate for the above-described residual capacity shortage. Note that the above-described charging pause time between the rapid charge and the first trickle charge is set to within the time which does not affect the activation (i.e., the time which is so short as not to affect the activation) of the rechargeable battery 3.

Figure 5:
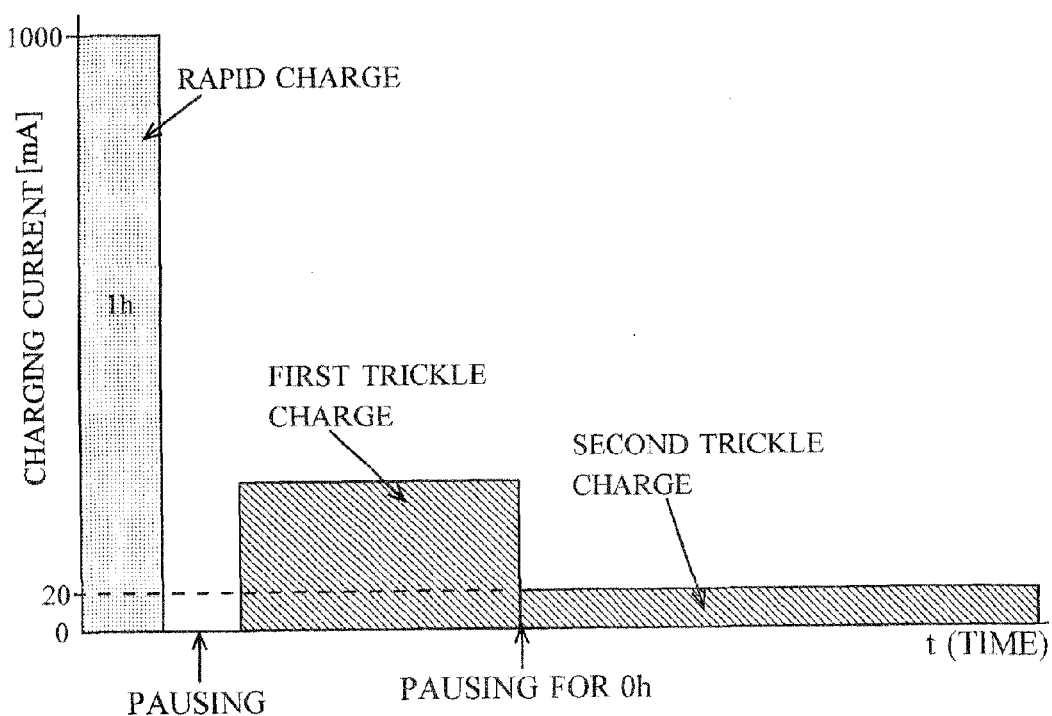
FIG. 5 is a graph showing another modified example of a pattern of the trickle charge in the above-described electrical shaver.

The pattern of the trickle charges shown in FIG. 5 is different from the pattern of the trickle charges shown in FIG. 4 in that a charging pause time is not set between each of the first and subsequent trickle charges. Other points are basically the same as the pattern of the trickle charges shown in FIG. 4. However, in this pattern of the trickle charges, a charging pause time is not set between each of the first and subsequent trickle charges, and the second trickle charge is continued. This results in increased total time of the second trickle charge. Considering this increased total time of the second trickle charge, the charging current value (20 milliamperes) in the second trickle charge in the pattern of the trickle charges shown in FIG. 5 is set lower than the charging current value (50 milliamperes) in the second and subsequent trickle charges shown in FIG. 4.

Figure 6:
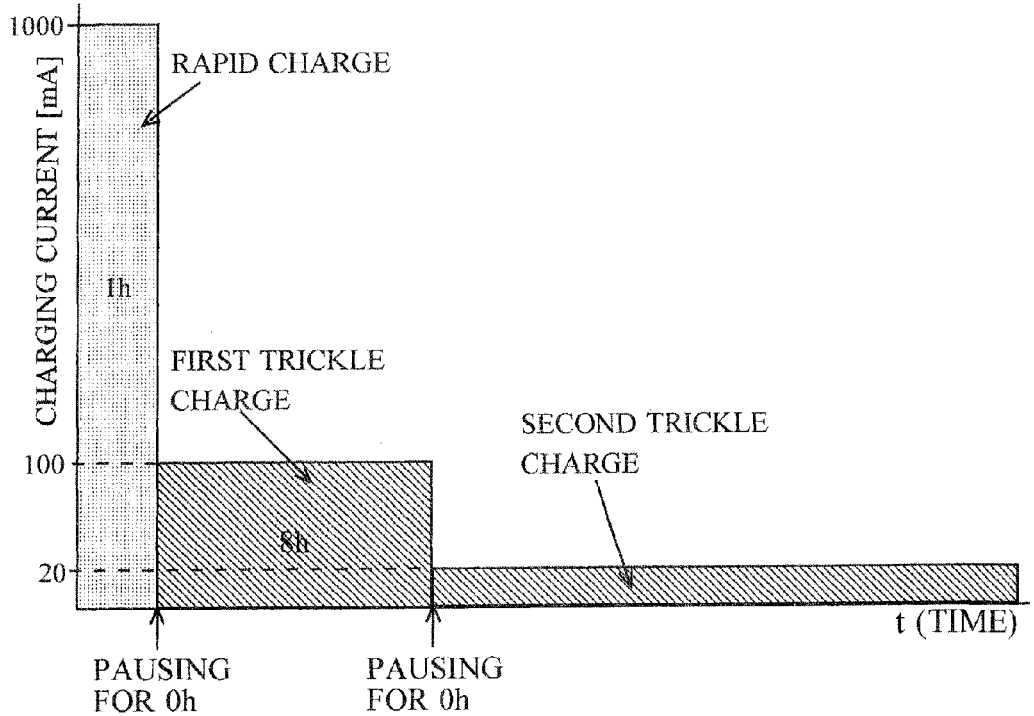
FIG. 6 is a graph showing another modified example of a pattern of the trickle charge in the above-described electrical shaver.

The pattern of the trickle charges shown in FIG. 6 is different from the pattern of the trickle charges shown in FIG. 2 in that a charging pause time is not set between each of the first and subsequent trickle charges. Other points are basically the same as the pattern of the trickle charges shown in FIG. 2. However, in this pattern of the trickle charges, a charging pause time is not set between each of the first and subsequent trickle charges, and the second trickle charge is continued. This results in increased total time of the second trickle charge. With this increased total time of the second trickle charge in mind, the charging current value (20 milliamperes) in the second trickle charge in the pattern of the trickle charges shown in FIG. 6 is set lower than the charging current value (50 milliamperes) in the second and subsequent trickle charges shown in FIG. 2.

Figure 7:
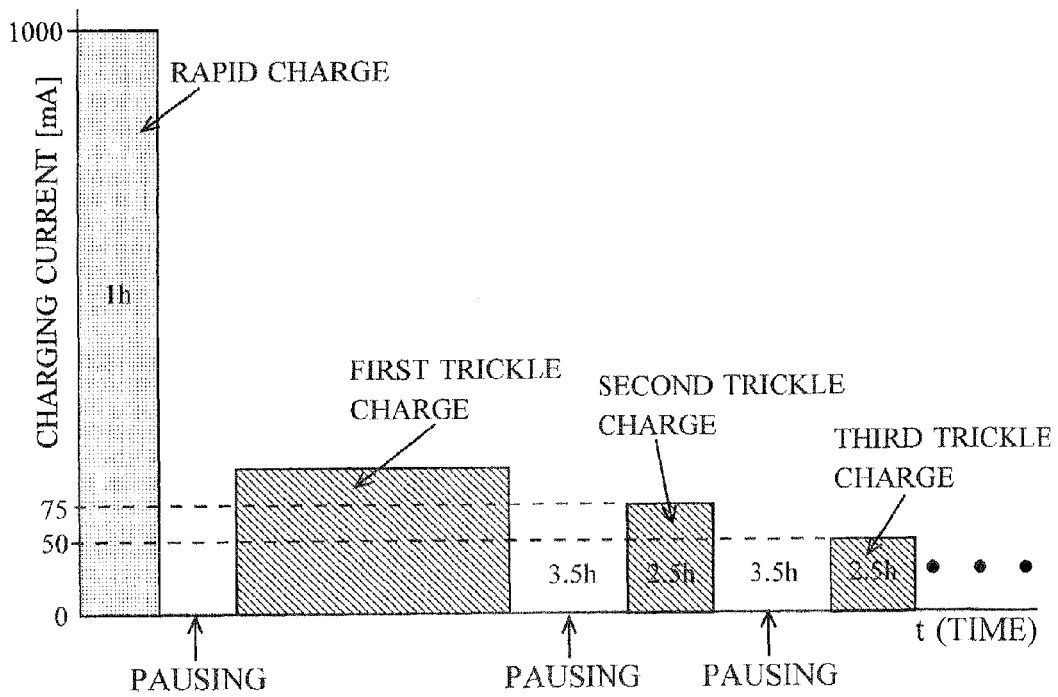
FIG. 7 is a graph showing another modified example of a pattern of the trickle charge in the above-described electrical shaver.

The pattern of the trickle charges shown in FIG. 7 is different from the pattern of the trickle charges shown in FIG. 4 in that the charging current value (75 milliamperes) in the second trickle charge is set higher than the charging current value (50 milliamperes) in the third trickle charge. Other points are basically the same as the pattern of the trickle charges shown in FIG. 4. Note that the charging current value in the fourth and subsequent trickle charge may be set lower than the charging current value (50 milliamperes) in the third trickle charge, or set equal to the charging current value in the third trickle charge.

As described above, according to the electrical shaver 1 of the present embodiment, the charging current value in the first trickle charge after the rapid charge is set to a different value from the charging current value in the second and subsequent trickle charges. Specifically, the charging current value in the second and subsequent trickle charges is set to a value lower than the charging current value in the first trickle charge. More specifically, in the first trickle charge, charging is performed with the charging current value required to simultaneously perform activating and charging the inactive battery (the rechargeable battery 3 which is inactive). On the other hand, in the second and subsequent trickle charges, charging is performed with the charging current value required to compensate for self-discharge of the rechargeable battery 3. Accordingly, in the first trickle charge, the electrical shaver 1 can simultaneously perform activating and charging the inactive battery. On the other hand, in the second and subsequent trickle charges, the electrical shaver 1 charges the rechargeable battery 3 with the charging current value required to compensate for self-discharge of the rechargeable battery 3. Thus, the electrical shaver 1 can reduce power consumption required to charge the rechargeable battery 3, as compared to the case where the trickle charge is continued with a constant charging current value, which is required to simultaneously activate and charge the inactive battery, as the above-described conventional rechargeable electrical device.

Additionally, in the case where the pattern of the trickle charges performed in the electrical shaver 1 is one of the patterns of the trickle charges shown in FIGS. 2, 4, 5 and 7, the microcomputer 5 sets a charging pause time between the rapid charge and the first trickle charge, and/or between each of the first and subsequent trickle charges. Thus, the electrical shaver 1 can further reduce power consumption required to charge the rechargeable battery 3, as compared to the case where the trickle charge is continued with a constant current value, which is required to simultaneously activate and charge the inactive battery, as the conventional rechargeable electrical device.

It is to be noted that the present invention is not limited to the above-described embodiment, and various modifications are possible within the spirit and scope of the present invention. For example, although the embodiment described above shows an example in which a rechargeable electrical device of the present invention is the electrical shaver 1, the present invention can be applied, for example, to a rechargeable electrical device such as a cellular phone or a portable information device. In addition, the rechargeable battery to be comprised in the rechargeable electrical device of the present invention is not necessarily a nickel metal hydride rechargeable battery. Further, although the embodiment described above shows an example in which the switching element 6 is a MOSFET, the switching element 6 may be a bipolar type transistor.

This application is based on Japanese patent application 2011-205027, and as a result, contents of this application should be united in the present invention referring to specifications and drawings of the above-described patent applications. In addition, although the present invention is fully described by the preferred embodiments with reference to the accompanying drawings, it is clear to the person having ordinary skill in the art that the various changes and modifications are applicable. Consequently, such changes and modifications do not depart from the scope of the present invention but should be interpreted to be included in the scope of the present invention.

The invention claimed is:

1. A rechargeable electrical device comprising:
   a rechargeable battery formed of at least one nickel metal hydride battery cell;
   a switching element provided between the rechargeable battery and a power source; and
   a control means which includes a time measuring means for measuring time, and which controls a duty cycle, which is a ratio of an on period and an off period of the switching element, based on time output from the time measuring means, so as to control a charging current value to the rechargeable battery,
   wherein charging the rechargeable battery includes both a rapid charge and a trickle charge to charge the rechargeable battery after a stop of the rapid charge with an electric current having a current value smaller than a charging current value in the rapid charge, and
   the control means sets the charging current value in a first trickle charge after the stop of the rapid charge to a different value from the charging current value in second and subsequent trickle charges after the stop of the rapid charge.

2. The rechargeable electrical device according to claim 1, wherein the control means sets a charging pause time between the rapid charge and the first trickle charge, and/or between each of first and subsequent trickle charges after the stop of the rapid charge.

3. The rechargeable electrical device according to claim 2, wherein the control means sets the charging current value in the second and subsequent trickle charges to a value lower than the charging current value in the first trickle charge.

4. The rechargeable electrical device according to claim 1, wherein the control means sets the charging current value in the second and subsequent trickle charges to a value lower than the charging current value in the first trickle charge.

* * * * *